(12) United States Patent
Bataillon et al.

(10) Patent No.: US 9,709,991 B2
(45) Date of Patent: Jul. 18, 2017

(54) MANAGEMENT OF THE ENERGY IN AN APPROACH TRAJECTORY

(71) Applicant: THALES, Courbevoie (FR)

(72) Inventors: Valérie Bataillon, Toulouse (FR); Sonia Vautier, Toulouse (FR); Emmanuel Dewas, Toulouse (FR)

(73) Assignee: THALES, Courbevoie (FR)

( * ) Notice: Subject to any disclaimer, the term of this patent is extended or adjusted under 35 U.S.C. 154(b) by 341 days.

(21) Appl. No.: 14/885,866

(22) Filed: Oct. 16, 2015

(65) Prior Publication Data

US 2016/0116917 A1     Apr. 28, 2016

(30) Foreign Application Priority Data

Oct. 24, 2014  (FR) ..................... 14 02389

(51) Int. Cl.
| | |
|---|---|
| *G05D 1/06* | (2006.01) |
| *G08G 5/00* | (2006.01) |
| *G08G 5/02* | (2006.01) |
| *G01C 21/20* | (2006.01) |
| *G05D 1/10* | (2006.01) |

(52) U.S. Cl.
CPC ........... *G05D 1/0676* (2013.01); *G01C 21/20* (2013.01); *G05D 1/101* (2013.01); *G08G 5/006* (2013.01); *G08G 5/0039* (2013.01); *G08G 5/025* (2013.01)

(58) Field of Classification Search
CPC .... G05D 1/0676; G05D 1/101; G08G 5/0039; G08G 5/025; G08G 5/006; G01C 21/20
See application file for complete search history.

(56) References Cited

U.S. PATENT DOCUMENTS

| | | | |
|---|---|---|---|
| 6,438,469 B1 | 8/2002 | Dwyer et al. | |
| 8,078,344 B2* | 12/2011 | Dwyer ................... | G01C 23/00 340/947 |
| 8,798,818 B2* | 8/2014 | Wiesemann ......... | G01C 23/005 701/16 |
| 9,262,931 B2* | 2/2016 | Parthasarathy .......... | G08G 5/02 |
| 9,273,969 B2* | 3/2016 | Parthasarathy ........ | G01C 23/00 |
| 9,274,529 B2* | 3/2016 | Ben-Shachar ....... | G05D 1/0676 |

(Continued)

FOREIGN PATENT DOCUMENTS

| | | |
|---|---|---|
| FR | 2 968 441 A1 | 6/2012 |
| FR | 2 968 818 A1 | 6/2012 |
| FR | 2 978 588 A1 | 2/2013 |

*Primary Examiner* — Richard Camby
(74) *Attorney, Agent, or Firm* — Baker & Hostetler LLP

(57) ABSTRACT

A method implemented by computer for calculating a lateral approach trajectory of an aircraft, comprises the steps of receiving selection of a landing runway; determining a zone Z1, the zone defining trajectory limits to carry out a last turn with a view to landing on the indicated runway; receiving indication of a trajectory point FF defining a point of alignment of the aircraft; determining a joining trajectory bound for a point FAF2, the joining trajectory going from the aircraft to the point FAF2 and then to the point FF and then to the indicated landing runway without passing through the zone Z1. Developments describe the use of a zone Z2 associated with visibility conditions, the calculation of the energy to be dissipated, the use of a predefined descent profile, the emission of alerts and trajectory adaptations by increasing the length of the joining trajectory or use of the airbrakes.

15 Claims, 6 Drawing Sheets

(56) References Cited

U.S. PATENT DOCUMENTS

| | | |
|---|---|---|
| 2004/0167685 A1 | 8/2004 | Ryan et al. |
| 2006/0200279 A1 | 9/2006 | Ainsworth et al. |
| 2012/0150369 A1 | 6/2012 | Giovannini et al. |
| 2013/0026299 A1 | 1/2013 | Constans et al. |

* cited by examiner

MANAGEMENT OF THE ENERGY IN AN APPROACH TRAJECTORY

CROSS-REFERENCE TO RELATED APPLICATION

This application claims priority to foreign French patent application No. FR 1402389, filed on Oct. 24, 2014, the disclosure of which is incorporated by reference in its entirety.

FIELD OF THE INVENTION

The invention relates to methods and systems for managing the flight of an aircraft, notably in regard to determination or prediction of trajectories.

BACKGROUND

During an approach trajectory with a view to a landing (be it considered "non-precision", that is to say with absence of joining of the runway threshold, or by visual approach or else by circling manoeuvre (MVL) or visual manoeuvring using prescribed track (VPT)), no aid is offered to the pilot to determine whether the aircraft will succeed in joining the runway threshold in a sufficiently stabilized manner to carry out the landing thereof.

In particular, no trajectory between the so-called "MAP" point (according to the beacon, VOR or DME) and the runway threshold point is available. The procedure is generally "flown by sight" from the MAP. Likewise for "non-precision" approaches which stop at the beacon and not at the runway threshold, the remainder of the procedure is flown by sight by the pilot.

Furthermore, for appropriate approach trajectories which lead to the runway threshold, when the air navigation provides its directives ("clearances"), these do not always correspond to the lateral and/or vertical parameters corresponding to the approach trajectory selected by the pilot. The latter must therefore judge the situation in an autonomous manner with respect to the trajectory provided by the FMS. For visual approaches, the approach trajectory is not generally optimized since it does not provide any joining of the so-called "Final Fix" point. For "precision" and "non-precision" approaches which lead to the runway threshold, for example in case of "radar vectoring" by the air navigation (e.g. the aircraft does not therefore fly the procedure as referenced in the navigation database), the pilot does not receive any aid with positioning the aircraft (notably in a vertical manner with respect to an optional ILS beam and with determining the moment at which he must carry out his turn so as to be placed correctly with respect to the runway threshold).

The current systems are generally characterized by an absence of possibility of constructing the approach manoeuvre (e.g. no storage: in the NAVDBs; difficulties for existing FMS flight management systems in respect of managing an arrival via a star/VIA on a runway, and in stringing this procedure together with a landing runway other than that related to the procedure)/

Moreover, the current solutions do not make it possible to calculate the energy dissipation over the trajectory which will actually be flown, thereby generally resulting in false alerts (i.e. too much energy for the landing, such alerts being unwarranted).

The prior art generally describes methods for calculating distance necessary to land on the runway ("Required Distance to Land" or RDTL) but this distance is generally determined by a direct distance to the runway and by the energy to be dissipated before reaching the runway. This approach comprises limitations. For example, patent document U.S. Pat. No. 6,438,469 entitled "FLIGHT CONTROL SYSTEM AND METHOD FOR AN AIRCRAFT CIRCLE-TO-LAND MANEUVER" describes a system for calculating a trajectory in the context of a visual approach. This approach also comprises limitations.

The present invention discloses several embodiments exhibiting advantages in relation to the limitations mentioned hereinabove.

SUMMARY OF THE INVENTION

There is disclosed a method for determining an approach trajectory which is optimized laterally (for example as a function of the aircraft capability and of the visibility afforded to the pilot) with no possibility of slaving to the said trajectory. According to one aspect of the invention, a warning based on the calculation of the trajectory thus determined can take account of the energy to be dissipated before landing.

According to one aspect of the invention, the method is aimed at determining one or more appropriate approach trajectories so as to allow the pilot to place his craft under optimal conditions, that is to say with a sufficient distance to eliminate its energy with a view to landing and according to a suitable trajectory allowing him to carry out an approach complying with the rules in common use.

Stated otherwise, the proposed technical solution consists notably in proposing a trajectory to the pilot which allows him to carry out his approach under the regulatory conditions (e.g. compliance with authorized zones) and the practical conditions of the flight (for example visualization of the runway, turn not overly tight, etc.) while ensuring that the energy that has to be reabsorbed for landing (potential and kinetic energy) will be able to be reabsorbed according to this trajectory.

As regards "non-precision" approaches (with non-joining of the runway threshold), in visual or "Circle to Land" mode, the method according to the invention determines a trajectory which is optimized in terms of capabilities of the aircraft and of management of the energy for stabilized arrival on the runway, with no possibility of slaving to this trajectory. According to an optional embodiment a visual warning can be displayed in case of "non-stability" on arrival at the runway threshold.

In regard to "precision" (type xLS) and "non-precision" approaches which lead to the runway threshold, the same determination steps can be proposed to the pilot if the approach is flown manually from a lateral point of view, that is to say if it is not flown in an automatic manner along the trajectory (i.e. LAT MAN).

Advantageously, the method according to the invention proposes to the pilot an optimized trajectory based on the current parameters of the aircraft.

Advantageously, the method according to the invention allows the pilot to determine as a function of the situation of the aircraft whether a landing is achievable without go-around (calculation of the energy dissipation) on the proposed trajectory.

Advantageously, the method according to the invention allows the pilot to be warned rapidly or in real time of the capability of the aircraft to join the runway threshold (e.g. loopback & recalculation of the trajectory and of the energy dissipated along the latter).

The present invention will advantageously be implemented in all avionic environments (e.g. aircraft, helicopter, etc.), including in regard to remotely-piloted or autonomous drones.

BRIEF DESCRIPTION OF THE DRAWINGS

Various aspects and advantages of the invention will become apparent in support of the description of a preferred but nonlimiting mode of implementation of the invention, with reference to the figures hereinbelow.

DETAILED DESCRIPTION

Figure 1:
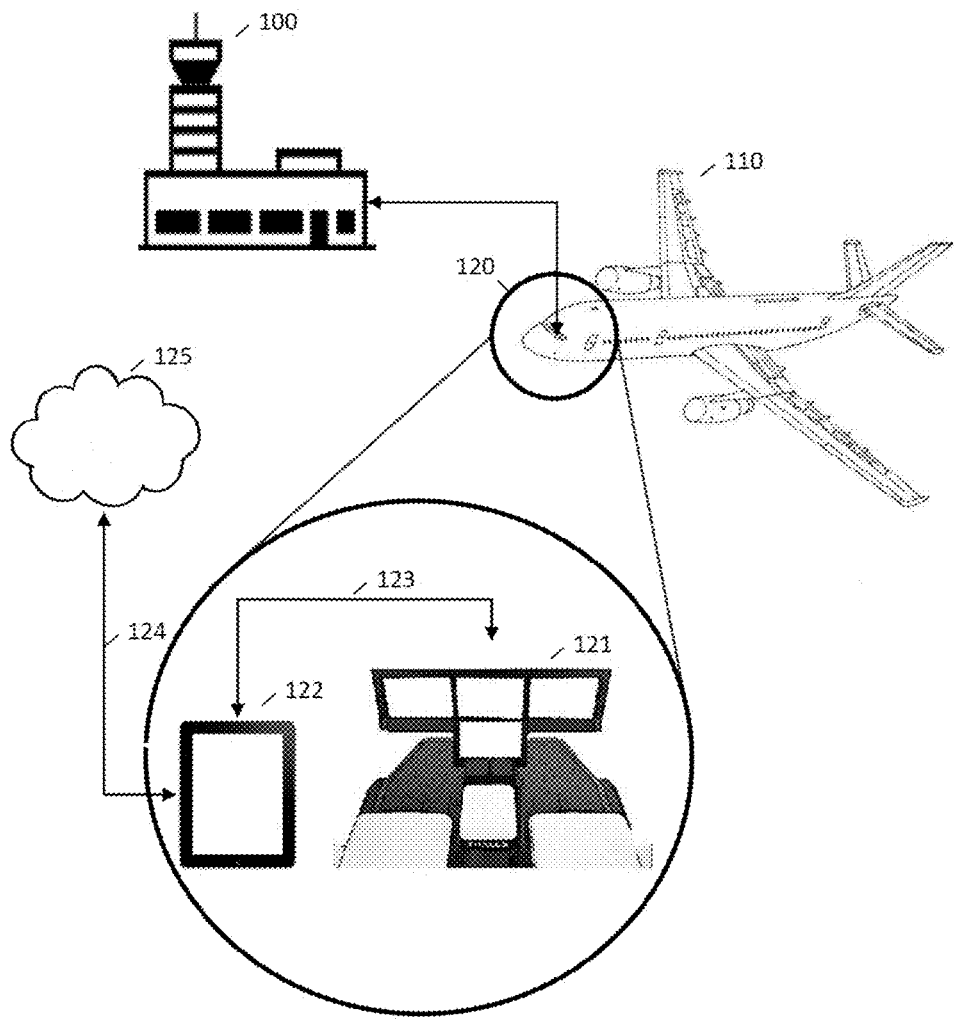
FIG. 1 illustrates the overall technical environment of the invention.

Certain technical terms and environments are defined hereinafter.

The pilot of an aircraft or aeroplane uses the flight plan information in several contexts: within the avionic equipment by means of the FMS (Flight Management System) and/or by means of an "EFB" (Electronic Flight Bag), for example of tablet type.

The acronym (or initials) EFB corresponds to the conventional terminology "Electronic Flight Bag" and refers to onboard electronic libraries. An EFB ("electronic flight bag" or "electronic flight tablet") is a portable electronic device used by flight personnel (for example pilots, maintenance, cabin, etc.). Various classes of EFB hardware exist. Class 1 EFBs are portable electronic devices (PED), which are not normally used during takeoff and disembarkation operations. This class of device does not require an administrative process for particular certification or authorization. Class 2 EFB devices are normally disposed in the cockpit, e.g. mounted in a position where they are used during all flight phases. This class of devices requires prior usage authorization. Class 1 and 2 devices are considered to be portable electronic devices. Fixed installations of class 3, such as computer media or fixed docking stations installed in the cockpit of aircraft, generally necessitate approval and certification on the part of the regulator.

The acronym (or initials) FMS corresponds to the conventional terminology "Flight Management System" and refers to the flight management systems of aircraft. During flight preparation or when rerouting, the crew undertakes the input of various items of information relating to the progress of the flight, typically by using an FMS aircraft flight management unit. An FMS comprises input means and display means, as well as calculation means. An operator, for example the pilot or the copilot, can input via the input means information such as RTAs, or "waypoints", associated with routing points, that is to say points vertically in line with which the aircraft must pass. The calculation means make it possible notably to calculate, on the basis of the flight plan comprising the list of waypoints, the trajectory of the aircraft, as a function of the geometry between the waypoints and/or of the conditions of altitude and of speed.

The acronym MMI corresponds to Man-Machine Interface (or HMI, Human Machine Interface). The input of the information, and the display of the information input or calculated by the display means, constitute such a man-machine interface. Generally, the MMI means allow the input and the consultation of the flight plan information, piloting data, etc.

A "transition" (or "step") corresponds to a change of flight level (FL for "Flight Level"). The flight levels are discrete and those which are authorized for cruising are prescribed by the air navigation control. The flight levels are measured in multiples of 100 feet. Conventionally, the flight levels authorized at high altitude are multiples of 1000, 2000 or 4000 feet (ft). For example in certain zones, the odd flight levels (29,000 feet/FL290, 31,000 feet/FL310, etc.) are authorized in the West to East direction and the even flight levels (30,000 ft/FL300, 32,000 ft/FL320, etc.) are authorized in the East to West direction.

A "route" comprises in particular a list of non-georeferenced identifiers making it possible to describe the trajectory of the aircraft.

A "flight plan" comprises notably a list of georeferenced objects associated with the identifiers of the route. A flight plan can generally be represented graphically by a succession (not necessarily continuous) of "segments" (or "flight portions" or "trajectory elements").

A "trajectory" is generally defined as a continuous path, described in 3 or more dimensions (spatial dimensions as regards the positions, but also speeds, time, mass, etc.), corresponding to a set of data describing the evolution of a plurality of physical parameters of the aircraft, as well as their dynamics in tandem with or as a function of the flight plan.

The "reference trajectory" corresponds in particular to the initially calculated trajectory. The "active trajectory" is that to which the aircraft is slaved. A "candidate trajectory" arises from an optimization, for example determined according to the invention, e.g. optionally calculated under constraints, but which is not yet activated. The "optimal trajectory" arises from an optimization without any constraint.

A vertical flight profile corresponds to the projection altitude-wise on a vertical plane of the trajectory as defined hereinabove.

A hold is a trajectory portion (or segment) carried out (i.e. flown) at (substantially) constant altitude.

A "change of flight level" (or "transition" or "transition between holds" or "step") is a trajectory portion describing the change from a hold carried out at a given flight level to the next (e.g. which may be above or below the current flight level).

There is disclosed a method implemented by computer for calculating a lateral approach trajectory of an aircraft, comprising the steps of receiving selection of a landing runway; determining a zone Z1, the said zone defining trajectory limits making it possible to carry out a last turn with a view to landing on the indicated runway; receiving indication of a trajectory point FF, the said point defining a point of alignment of the aircraft with a view to landing on the selected landing runway; and determining a joining trajectory bound for a point FAF2 different from the point FF, the joining trajectory going from the aircraft to the point FAF2 and then to the point FF and then to the indicated landing runway without passing through the zone Z1.

The landing runway is selected by the pilot and/or indicated by the air navigation. The point FF ("Final Fix") is known from the prior art: it is received as a function of the aircraft and of published standards.

The zone Z1 is calculated or determined by the method according to the invention. The area Z1 360 represents the lower limits of an area allowing the aircraft as a function of these manoeuvrability capabilities and exterior conditions (notably of visibility and as regards the force of the wind) to perform its last turn before landing. Stated otherwise, the zone Z1 is a zone to be avoided by the aircraft. Advantageously, if the aircraft does not deploy in the zone Z1, it will be possible for it to overfly the runway and to perform a last turn so as to land facing into the wind. The determination of the zone Z1 is in particular dependent on the characteristics of the aircraft (i.e. its capabilities) and/or published standards. Generally the radius of Z1 is associated with the minimum distance of the aircraft from the runway axis making it possible to carry out a 180° turn with optimal roll.

The point FAF2 is not known from the prior art. The point FAF2 according to the invention corresponds to a point making it possible to avoid the zone Z1 as determined by the invention. The point FAF2 being determined, one or more joining trajectories are determined (envelopes of trajectories).

A joining trajectory is generally determined by the circumvention of an area Z1 (respectively Z2 defined hereinafter). This circumvention is notably dependent on the zone (ZG or ZD) where the aircraft is situated in relation to the axis determined by the position of the point FF.

The zone ZG corresponds to the zone situated on the opposite side of the landing point of the aircraft from the axis FF where the aircraft must determine its lateral trajectory as a function of Z1 (and of Z2 if appropriate).

The zone ZD corresponds to the zone situated on the adjacent side of the landing point in relation to the axis FF; in this case the aircraft must determine its lateral trajectory as a function of Z1 alone.

In certain embodiments of the invention, the area Z1 is equivalent to a semicircle of radius which is dependent on a distance termed Dmin. In a particular embodiment, the radius of Z1 is equal to Dmin/2. The value of Dmin 340 is determined by the minimum distance from the runway axis making it possible to carry out a 180° turn with maximum roll (in the flight envelope of the aircraft, making it possible to preserve a "visual" on the runway, i.e. that is to say a visibility greater than one or more predefined thresholds or conditions). In a particular case, the value Dmin complies with the published volumes for performing a manoeuvre in case of CTL approach (this distance is therefore provided for this type of approach; see ARINC424-20 and 5.292 Category Distance).

In a development, the method furthermore comprises steps of determining a zone Z2 delimited by boundaries F1 and F2, the zone Z2 defining a zone associated with conditions of visibility of the landing runway, the boundary F1 being associated with an integration length in a tailwind and the boundary F2 being associated with the length of the landing runway; and modifying the joining trajectory so as to cause the said joining trajectory to pass through one or the other of the boundaries F1 or F2.

The zone Z2 is the zone to be complied with so as to ensure good visualization of the runway, according to predefined criteria which are configured or configurable (by the pilot or the airline or the aeronautical rules). Stated otherwise, this zone Z2 represents the lower limits of an area allowing the pilot to preserve good visualization of the runway.

The area Z2 370 is a zone or area which is considered only when the aircraft is situated in the zone ZG.

The dimensions of this zone Z2 in certain embodiments are defined as described hereinafter. One dimension of the zone Z2 is associated with the length of the landing runway, to within a factor K. The value of K is adjustable i.e. generally configured since it is configurable and makes it possible to guarantee arrival parallel to the runway, stabilized, in "counter QFU" with a guaranteed visibility. Stated otherwise, the length of Z2 equals the factor K multiplied by the known runway length (with K>=1). The width of the zone Z2 will generally be equal to (Dmax−Dmin).

The value Dmax 350 is the value of the maximum distance from the runway axis still making it possible to have or to preserve a "visual" on the runway, i.e. to maintain minimum conditions of visibility, such as determined by predefined thresholds. The value Dmax can notably be determined by the category of the aircraft, as well as by the restriction area for the approach carried out (i.e. ICAO compliant, e.g. for a CTL A/C category A, area=2.4 $Nm^2$).

In a development, the method furthermore comprises a step of modifying the joining trajectory in such a way that the said joining trajectory passes through a point FAF3, the point FAF3 being the intersection of the boundaries F1 and F2.

In a development, the method furthermore comprises a step of determining the total energy to be dissipated along the joining trajectory.

The energy to be dissipated corresponds to the total energy, i.e. resulting from the addition of the kinetic energy (momentum) and of the potential energy (altitude) of the aircraft. This energy is calculated via the laws of physics, taking into account notably the characteristics of the aircraft ("aircrconf", i.e. the configuration of the flaps). The prior art provides various schemes for deterministic calculation of this energy (ARINC standard, limit speeds, category of craft, etc.) This energy is notably determined on the basis of a descent profile (current aircraft parameters i.e. speed, altitude, "aircrconf"). This calculation of the energy can be based on a predefined descent profile or according to the aeronautical rules. The calculation is updated as a function of the actions of the pilot and/or of the flight conditions (e.g. winds etc.).

In a development, the said determination is based on a predefined descent profile.

In a particular case, the (vertical) descent profile may be known on at least one part of the trajectory ("automatic guidance" or slaved mode). In this case, the energy to be dissipated can be determined by anticipation on the segment concerned.

In a development, the method furthermore comprises a step of comparing the total energy to be dissipated and the energy associated with the joining trajectory determined.

The energy associated with the joining trajectory is the "dissipatable" energy or the energy that it is possible for the aircraft to dissipate along the joining trajectory.

In a development, the method furthermore comprises a step of emitting an alert if the energy associated with the joining trajectory such as determined is greater than the total energy to be dissipated or in performing a display of conformity if the energy associated with the joining trajectory such as determined is less than the total energy to be dissipated.

The notification can be done by display (visual and/or audio, or by other means), for example in the flight cockpit (for example display on a screen of the FMS). Optionally, physical displays on the runway itself can be performed.

In a development, the method furthermore comprises a step of modifying the joining trajectory if the energy associated with the joining trajectory such as determined is greater than the total energy to be dissipated.

In a development, the method furthermore comprises a step of increasing the length of the joining trajectory.

The increase in the length makes it possible advantageously to dissipate the excess energy.

In a development, the method furthermore comprises a step of using the airbrakes of the aircraft.

In a development, the step of increasing the length of the joining trajectory comprises a step of spatially displacing any one of the determined points FF, FAF2 or FAF3 by adding a straight section.

In a development, the steps previously described are repeated over time.

The joining trajectory is modified as a function of the determination of the total energy to be dissipated (which is itself determined in a repeated manner over time, in tandem with the progress of the aircraft).

The steps according to the method are updated or repeated or reiterated over time. As a function of the actions of the pilot and/or of the actual flight conditions, one or more of the steps of the method are repeated. Stated otherwise, in tandem with the progress of the craft in space, the calculations are repeated in all or part. The repetition or reiteration can be done in a regular or irregular, periodic or intermittent, etc. manner. The method recalculates constantly/continuously/in real time the energy to be dissipated. For example, the alert telltale can switch or switch back to "alarm" telltale if the energy becomes insufficient (for example, the pilot may not follow the descent profile, the winds may be or become unfavourable, etc.).

As a function of the recalculation of the energy to be dissipated, the trajectory may also be recalculated (in an automatic manner and/or at the request of the pilot).

There is disclosed a computer program product, comprising code instructions making it possible to perform one or more of the steps of the method, when the said program is executed on a computer.

There is disclosed a system comprising means for implementing one or more steps of the method.

In a development, the system comprises avionic means of Flight Management System (FMS) type and/or non-avionic means of Electronic Flight Bag (EFB) type and/or means of augmented or virtual reality.

For example calculations of the points FF are performed by the component FPLN, that of the lateral trajectory by the component TRAJ, that of the energy calculation by the component PRED, with loopback to FPLN and/or TRAJ, the display being performed on the MMI part.

FIG. 1 illustrates the overall technical environment of the invention. Avionic equipment or airport means 100 (for example a control tower linked with the air traffic control systems) are in communication with an aircraft 110. An aircraft is a transport means capable of deploying within the terrestrial atmosphere. For example, an aircraft can be an aeroplane or a helicopter (or else a drone). The aircraft comprises a flight cabin or a cockpit 120. Within the cockpit are situated piloting equipment 121 (so-called avionic equipment), for example comprising one or more onboard processors (means of calculation, storage and saving of data), including an FMS, means of display or visualization and input of data, communication means, as well as (optionally) haptic feedback means. An EFB 122 may be situated aboard, in a portable manner or integrated into the cockpit. The said EFB can interact (bilateral communication 123) with the avionic equipment 121. The EFB can also be in communication 124 with external computing resources, accessible through the network (for example cloud computing 125). In particular, the calculations can be performed locally on the EFB or partially or totally in the calculation means accessible by the network. The onboard equipment 121 is generally certified and regulated while the EFB 122 and the connected computing means 125 are generally not (or to a lesser extent). This architecture makes it possible to inject flexibility on the EFB 122 side by ensuring controlled security on the onboard avionics 121 side.

Figure 2:
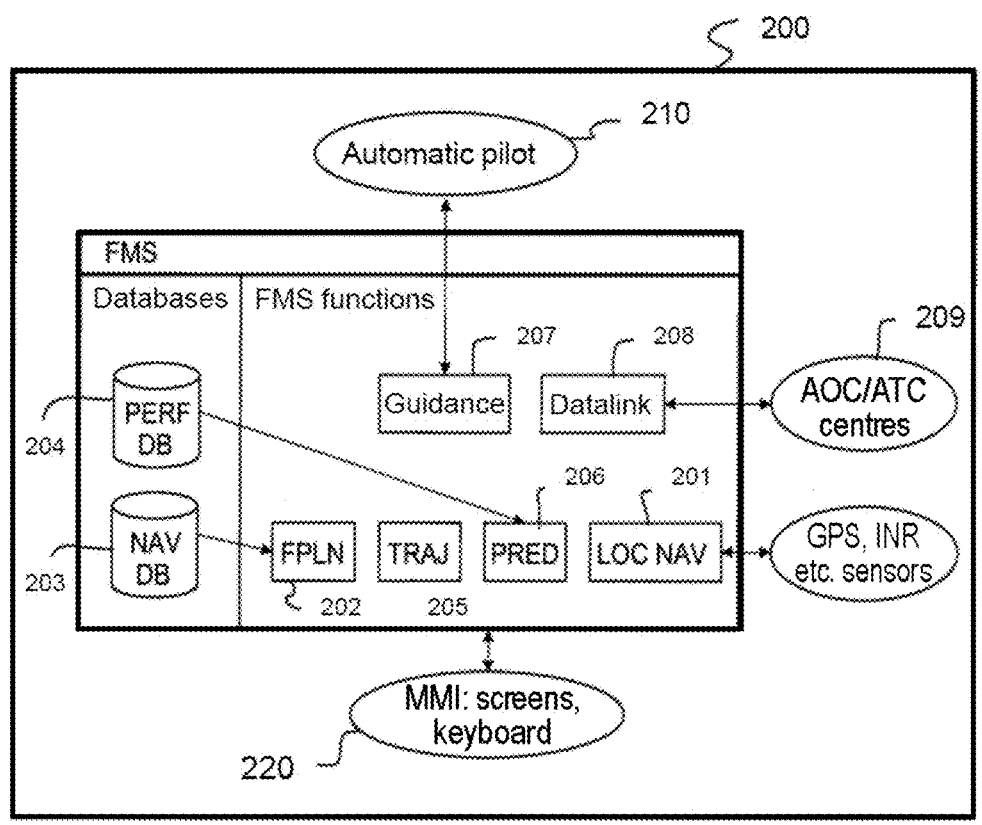
FIG. 2 schematically illustrates the structure and the functions of a flight management system of known FMS type.

FIG. 2 schematically illustrates the structure and the functions of a flight management system of known FMS type. A system of FMS type 200 disposed in the cockpit 120 and the avionic means 121 has a man-machine interface 220 comprising input means, for example formed by a keyboard, and display means, for example formed by a display screen, or else simply a tactile display screen, as well as at least the following functions:

Navigation (LOCNAV) 201, for performing optimal location of the aircraft as a function of the geolocation means 230 such as geo-positioning by satellite or GPS, GALILEO, VHF radionavigation beacons, inertial platforms. This module communicates with the aforementioned geolocation units;

Flight plan (FPLN) 202, for inputting the geographical elements constituting the "skeleton" of the route to be followed, such as the points prescribed by the departure and arrival procedures, the routing points, the air corridors, commonly referred to as "airways". The methods and systems described affect or relate to this part of the processor;

Navigation database (NAVDB) 203, for constructing geographical routes and procedures with the help of data included in the bases relating to the points, beacons, interception legs or altitude legs, etc.;

Performance database, (PERFDB) 204, containing the craft's aerodynamic and engine parameters;

Lateral trajectory (TRAJ) 205, for constructing a continuous trajectory on the basis of the points of the flight plan, complying with the performance of the aircraft and the confinement constraints (RNP);

Predictions (PRED) 206, for constructing an optimized vertical profile on the lateral and vertical trajectory and giving the estimations of distance, time, altitude, speed, fuel and wind notably on each point, at each change of piloting parameter and at destination, and which will be displayed to the crew. The methods and systems described affect or relate mainly to this part of the processor;

Guidance (GUID) 207, for guiding in the lateral and vertical planes the aircraft on its three-dimensional trajectory, while optimizing its speed, with the aid of the information calculated by the Predictions function 206. In an aircraft equipped with an automatic piloting unit 210, the latter can exchange information with the guidance module 207;

Digital data link (DATALINK) 208 for exchanging flight information between the Flight plan/Predictions functions and the control centres or other aircraft 209;

One or more screens, notably the so-called FMD, ND and VD screens.

The FMD ("Flight Management Display") is an interface, generally a display screen, which may be interactive (for example a touchscreen), making it possible to interact with the FMS (Flight Management System). For example, it makes it possible to define a route and to trigger the calculation of the flight plan and of the associated trajectory. It also makes it possible to consult the result of the calculation in text form.

The ND ("Navigation display") is an interface, generally a display screen, which may be interactive (for example a touchscreen), making it possible to consult in two dimensions the lateral trajectory of the aircraft, viewed from above. Various modes of visualization are available (rose, plane, arc, etc.) as well as according to various scales (configurable).

The VD ("Vertical Display") is an interface, generally a display screen, which may be interactive (for example a touchscreen), making it possible to consult in two dimensions the vertical profile, the projection of the trajectory. Just as for the ND, various scales are possible.

On the basis of the flight plan defined by the pilot (list of waypoints), the lateral trajectory is calculated as a function of the geometry between the waypoints (customarily called LEGs) and/or the altitude and speed conditions (which are used for the calculation of the turning radius). On this lateral trajectory, the flight management system FMS optimizes a vertical trajectory (in terms of altitude and speed), passing through possible altitude, speed, time constraints.

On the basis of the landing runway—such as defined by the pilot, the system calculates (a) the by-sight approach trajectory as well as the information relating to the landing capability as regards "energy", when the aircraft is guided manually (that is to say not by the FMS), or else (b) solely the information about landing capability in terms of energy when the aircraft is guided in an automatic manner.

Figure 3:
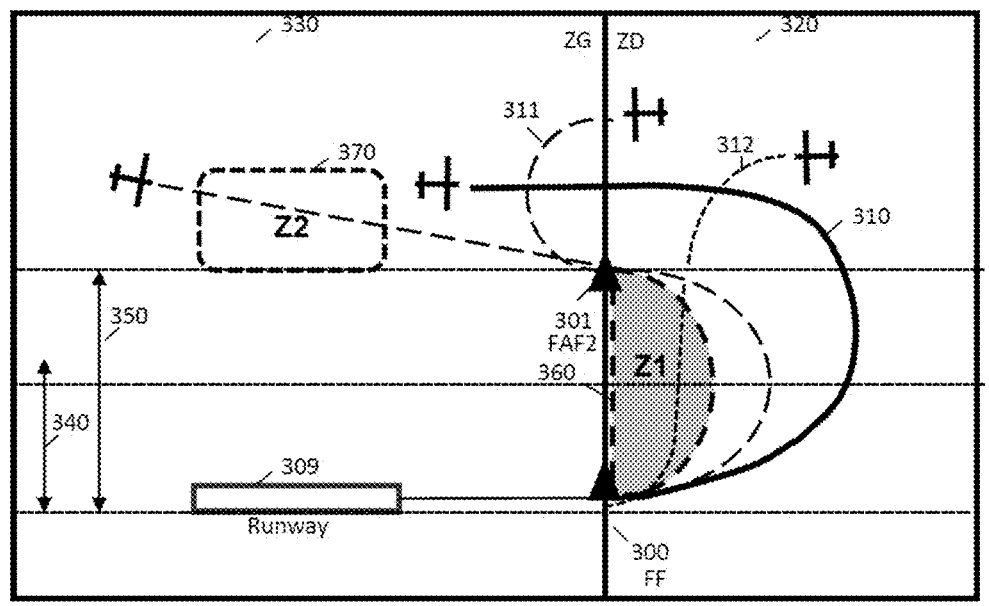
FIG. 3 illustrates examples of approach trajectory according to various embodiments of the method according to the invention.

FIG. 3 illustrates examples of approach trajectory according to embodiments of the method according to the invention.

The method according to the invention comprises notably two successive steps.

In a first step (A), there is proposed an approach trajectory that is optimized or "ideal" according to various predefined criteria (for example such as trajectory of arrival of the aircraft in the zone, zone to be complied with, zone to be avoided etc.). The energy which it will be possible to dissipate along this approach trajectory is determined thereafter. Comparison of this dissipated energy with the maximum energy necessary for the landing will make it possible to inform the pilot about the feasibility or non-feasibility of the landing (under the conditions thus fixed).

Subsequently, this optimized approach trajectory is modified or adapted so as to guarantee the landing from an energy point of view.

Examples of the steps of the method are described in greater detail hereinafter.

In order to determine the approach trajectory and the "energy" aspects associated with the said trajectory the "FF" point 300 (Final Fix) is calculated or determined. This point is the point on which the aircraft must be aligned with a view to landing. This point may be known (for example published by the air navigation authorities and therefore available for example via the navigation databases of the onboard equipment such as the flight management system FMS for the approaches leading to the runway threshold). Alternatively, this point can be determined or calculated on the basis of the coordinates of the runway, by for example considering usual values (for example 1500 ft above the runway threshold, slope of 3° or 5%; or a pilot input as regards the distance (i.e. case of visual approaches).

The so-called "joining" trajectory (for example 310) is determined thereafter. On the basis of the point of arrival in the approach zone,—which may for example be the last approach point selected by the pilot—(MAP for "Missed Approach Point") or else the aircraft itself, which assumption will be retained in the subsequent description of the method, there is determined or calculated a trajectory starting from this point and making it possible to arrive "aligned" with the runway axis at the point FF 300. The proposed trajectory is generally the shortest trajectory allowing alignment. However, this trajectory is not optimal from a regulatory or practical point of view.

Advantageously, its determination or construction can be conducted in the following manner:

Space restrictions are firstly defined. It is indeed possible to consider the following zones: a zone termed "ZD" 320 i.e. a zone on the right of the axis perpendicular to the FF and a zone termed "ZG" 330 i.e. a zone on the left of the axis perpendicular to the FF. The minimum distance termed "Dmin" 340 is the minimum distance from the runway axis making it possible to carry out a 180° turn with maximum roll (in the envelope of the flight trajectory of the aircraft, e.g. making it possible to preserve a suitable visual on the runway), i.e. in accordance with the published "volumes" for performing the manoeuvre in case of CTL approach (cf. The standard ARINC424-20 5.292 Category Distance). The distance termed "Dmax" 350 is the maximum distance from the runway axis making it possible to still have a visual on the runway, determined by the category of the A/C and the restriction area for the approach carried out (i.e. ICAO compliant, e.g. for a CTL A/C category A, area=2.4 $Nm^2$).

On the basis of these data, it is possible to determine the following zones: the zone termed Z1 360 and the zone termed Z2 370.

The zone Z1 360 is a zone to be avoided for carrying out a last turn complying with the rules about the roll. The determination of an optimal roll is aimed at avoiding too low a roll or conversely too high a roll (e.g. to retain optimal visibility of the runway, to avoid too low a roll i.e. "overshoot" at the end of the turn, to avoid too great a roll e.g. impacting the stability of the aircraft and/or the comfort of the passengers (passenger comfort). The radius of the zone Z1 360 is generally equal to the distance value Dmin divided by two.

The zone termed Z2 370 is the zone to be complied with to ensure good visualization of the runway. The value of K is adjustable and makes it possible to guarantee arrival parallel to the runway, stabilized, in "counter QFU" with a guaranteed visibility. This zone allows compliance with the published volumes as a function of the type of approach.

FIG. 3 illustrates various examples of approaches.

In a first example, the aircraft is in the zone ZD 320. ("Integration in base or Semi-Direct"). In this case, a joining trajectory 310 in respect of the FF 300 with alignment with the axis of the runway is determined. If the trajectory does not pass through the zone Z1 then the latter is preserved, otherwise a joining trajectory is calculated bound for a point FAF2 301 situated on the axis perpendicular to the final approach at the level of the FF 300, far enough away as to guarantee a maximum roll for the alignment at the FF 300.

In a second example, the aircraft is in the zone ZG 330 (this situation for example corresponds to an integration in a tailwind). In this case, a joining trajectory 311 in respect of the FF 300 with alignment with the axis of the runway is calculated. If the trajectory 312 passes through the zone Z1 then the latter is modified, so as to obtain a joining trajectory 311 bound for a point FAF2 301 situated on the axis perpendicular to the final approach at the level of the FF 300, far enough away as to guarantee a maximum roll for the alignment at the FF 300.

Figure 4:
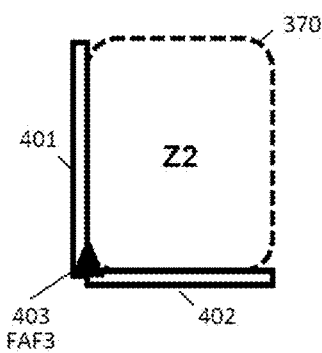
FIG. 4 illustrates a development of the method for the management of the boundaries of zones.

FIG. 4 illustrates a development of the method for the management of the boundaries of zones. In order to guarantee good visualization of the runway, it is preferable to re-enter the zone Z2 370 through the boundaries F1 401 (integration at the start of a tailwind) or else F2 402 (after overflying the runway).

In the case where the trajectory passes through the zone Z2 and more precisely through the boundaries F1 or F2, the approach trajectory is preserved. In the converse case, there is calculated an approach trajectory arriving at the point FAF3 403, the intersection of F1 and F2.

Figure 5:
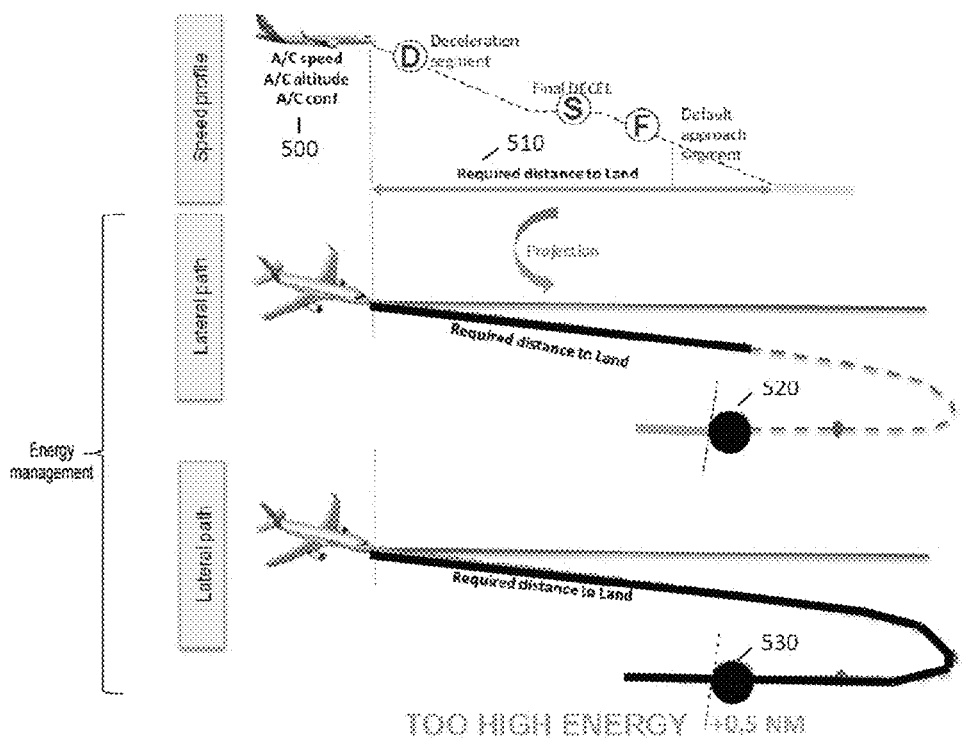
FIG. 5 illustrates the determination of the energy that can be dissipated for an approach trajectory.

FIG. 5 illustrates the determination of the energy that may be dissipated for an approach trajectory.

This calculation is notably based on current parameters 500 of the aircraft (for example altitude, speed and "Aircrconf"). However, account will also be taken of the "aircrconf" and of the approach speed (VAPP) selected for the landing. The vertical profile to be followed will therefore include a deceleration segment between the aircraft's current speed to the VAPP as well as a hold to achieve the approach "aircrconf" selected (at 1500 ft AGL). The distance 510 necessary for the resorption of energy is determined, notably by starting from the aircraft parameters.

If the trajectory determined provides a greater distance 530 than the distance calculated, a conformity symbol is displayed on the runway threshold. By default, an alert symbol (marker 520) is displayed.

According to a variant, these same symbols can be displayed at the point FF, for example as a function of the disparity between the calculated energy (total energy, or altitude/speed pair) and a target energy (altitude of the FF, and stabilization speed VAPP for example). These displays can notably be performed on the various screens of the cockpit (FMD, ND, VD, PFD or indeed HUD, headset etc.)

The deceleration factor will for example be able to be limited on the "deceleration segment" as a function of the aircraft category. This determination makes it possible to inform the pilot about the feasibility of the landing according to the proposed trajectory so that he can decide accordingly how to follow up subsequently. In the presence of a marker 520, the aircraft can join the runway in a stabilized manner; in the situation associated with the marker 530 the risk of go-around may be significant.

Figure 6:
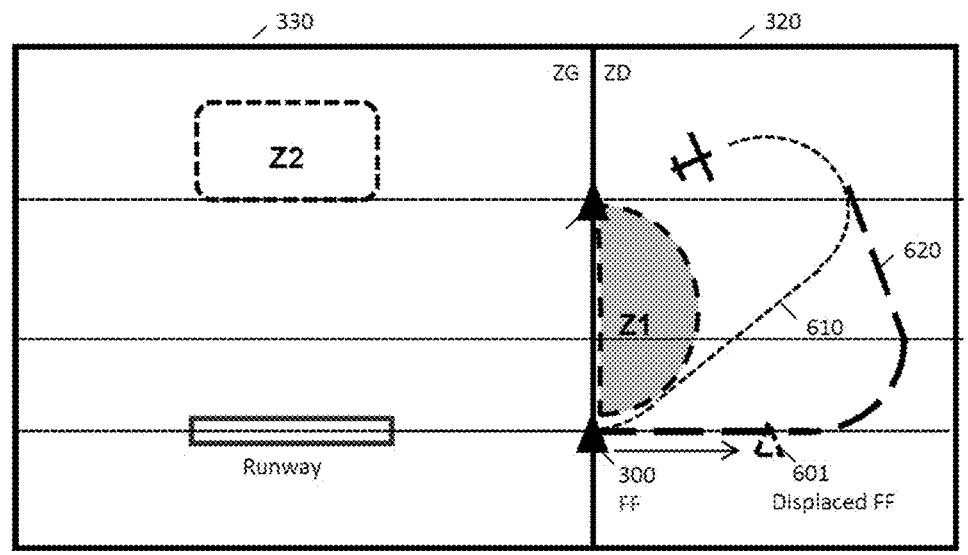
FIGS. 6 and 7 illustrate examples of determining approach trajectories that are optimized in "energy" terms.
Figure 7:
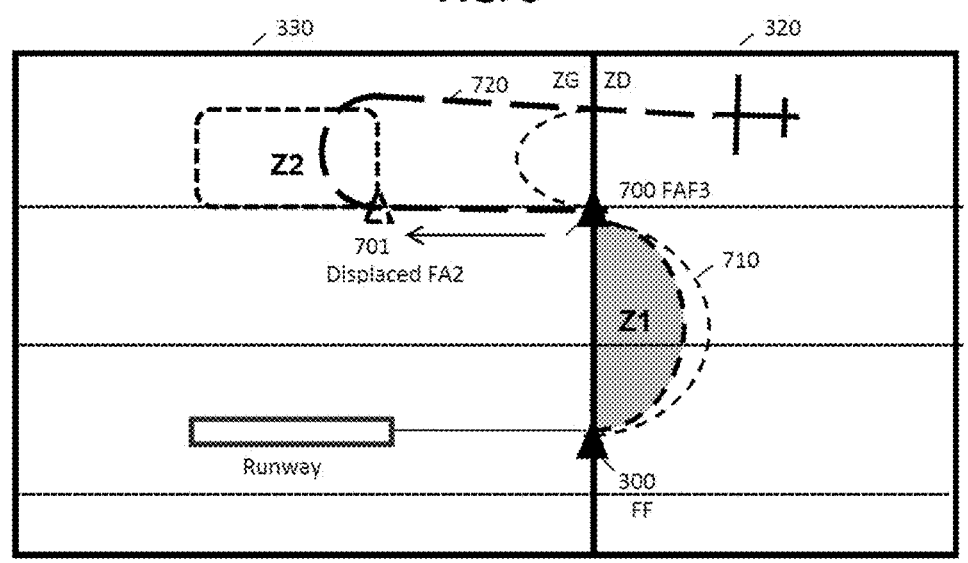

FIGS. 6 and 7 illustrate examples of determining approach trajectories optimized in "energy" terms. These examples correspond to the second part (B) of the method according to the invention.

In the case where the trajectory does not make it possible to dissipate sufficient energy with a view to landing, the method according to the invention comprises steps making it possible to adjust the trajectory so as to increase the distance to be travelled and thus to dissipate the necessary energy.

In the case of a trajectory 610, represented in FIG. 6, starting from the zone ZD and not passing through Z1 (that is to say joining the point FF directly), a displaced FF 601 will be determined along the runway axis by moving away from the runway threshold so as to increase the trajectory distance 620, doing so as much as is necessary to eliminate the excess energy.

In the case of a trajectory, represented in FIG. 7, starting from the zone ZD passing through Z1 and therefore joining the point FAF2, a displaced FAF2 701 will be calculated along the axis parallel to the runway passing through FAF2 so as to increase the trajectory distance as much as is necessary to eliminate the excess energy. However, the displacement of the point FF will still be limited to the volume authorized for approaches of CTL type; if this turns out to be insufficient it will be possible to lengthen the "straight" from the aircraft before "commencing roll".

In the case of a trajectory, not represented, from the zone ZG passing through Z2 and joining a point FAF3, a displaced point FAF3 can similarly be calculated along the axis parallel to the runway passing through FAF3 so as to increase the trajectory distance as much as is necessary to eliminate the excess energy.

Figure 8:
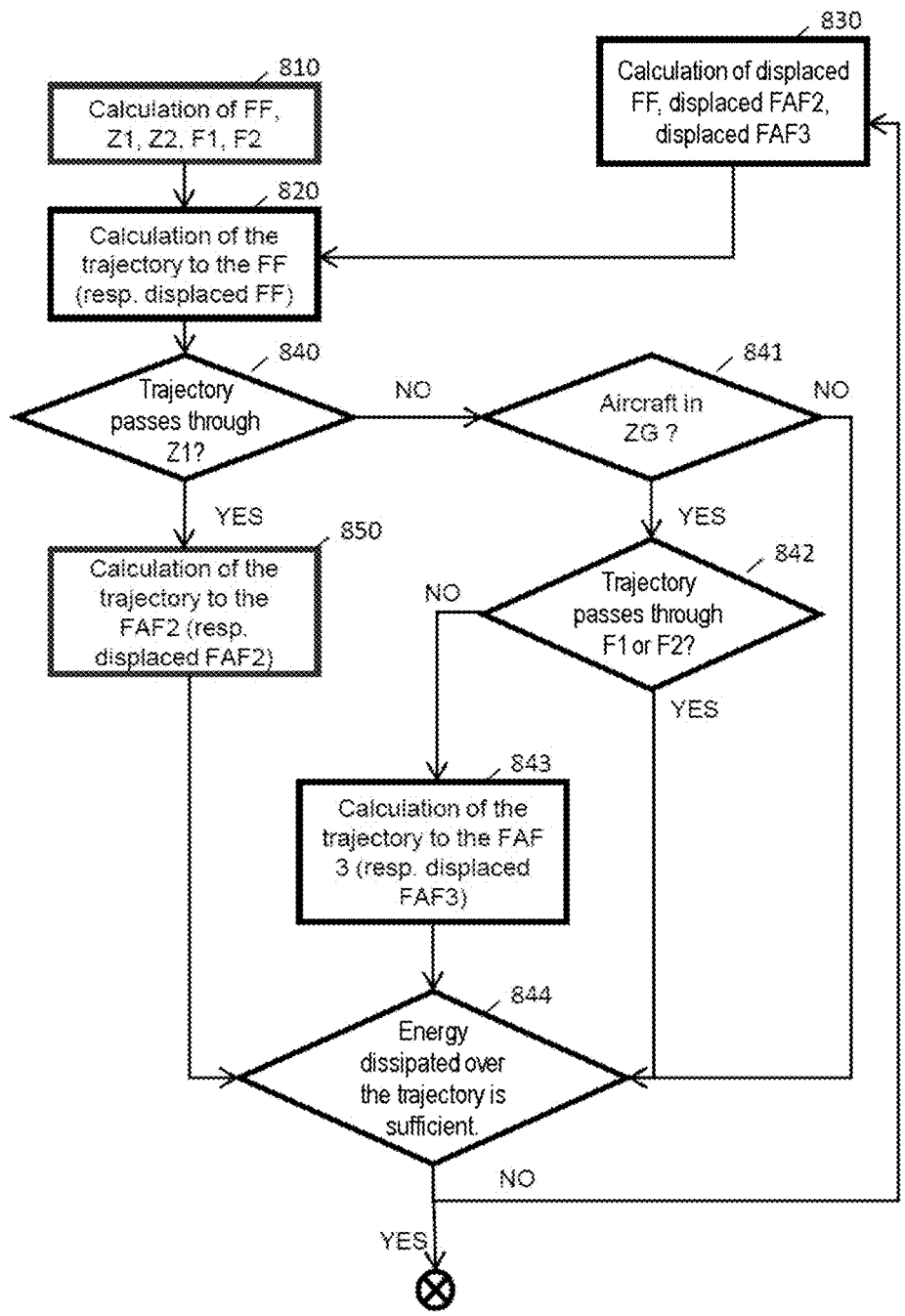
FIG. 8 illustrates examples of steps of the method according to the invention.

FIG. 8 illustrates examples of steps of the method according to the invention. In step 810 are determined: the point FF, the zones Z1 and Z2, the boundaries F1 and F2 of Z2. In step 820, the trajectory bound for the point FF is determined. In an optional manner in step 830, the displaced point FF is determined. If appropriate, the trajectory bound for the displaced point FF is determined. In step 840, it is determined whether the trajectory thus calculated passes through the zone Z1.

If the trajectory thus calculated does not pass through the zone Z1, then in step 841, it is determined whether the aircraft is in the left zone ZG. In the negative it is determined in step 844 whether the energy dissipated over the trajectory is sufficient. In the affirmative, it is determined in step 842 whether the trajectory passes through the boundaries F1 or F2. In the affirmative, it is determined in step 844 whether the energy dissipated over the trajectory is sufficient. If the energy dissipated over the trajectory is not sufficient, step 830 of determining the displaced point FF is repeated. If the energy dissipated over the trajectory is sufficient, the approach trajectory is validated.

If the calculated trajectory passes through the zone Z1, in step 850 there is determined a trajectory bound for the point FAF2 (respectively the displaced point FAF2). In step 844, it is determined whether the energy dissipated over the trajectory is sufficient. If the energy dissipated over the trajectory is not sufficient, step 830 of determining the displaced point FF is repeated. If the energy dissipated over the trajectory is sufficient, the approach trajectory is validated.

According to a variant embodiment of the method according to the invention, in the case where the aircraft is guided laterally along the planned trajectory, the calculation can be limited to the steps of determining the energy dissipated (along the trajectory planned by the pilot) so as to inform him regarding his capability to carry out his landing from an energy point of view.

The present invention may be implemented on the basis of hardware and/or software elements. It may be available in the guise of a computer program product on a medium readable by computer. The medium may be electronic, magnetic, optical or electromagnetic. The computing means or resources may be distributed ("Cloud computing").

The invention claimed is:

1. A method implemented by computer for calculating a lateral approach trajectory of an aircraft, comprising the steps of:

receiving selection of a landing runway;

receiving indication of a trajectory point FF, said trajectory point FF defining a point of alignment of the aircraft with a view to landing on the selected landing runway;

determining a zone Z1 to be avoided, said zone Z1 defining trajectory limits to carry out a last turn with a view to landing on the runway as a function of manoeuvrability capabilities of said aircraft and of conditions exterior to said aircraft;

determining a joining trajectory bound for a point FAF2 situated on the axis perpendicular to the final approach at the level of the point FF and far enough away as to guarantee a maximum roll for the alignment at said point FF, the joining trajectory going from the aircraft to the point FAF2 and then to the point FF and then to the indicated landing runway without passing through the zone Z1.

2. The method according to claim 1, the aircraft being situated in the zone on the left ZG of the perpendicular axis at the point FF, the method further comprising steps of:

determining a zone Z2 delimited by boundaries F1 and F2, the zone Z2 defining a zone associated with conditions of visibility of the landing runway, the visibility conditions being superior to one or more predefined thresholds, the boundary F1 being associated with an integration length in a tailwind and the boundary F2 being associated with the length of the landing runway; and modifying the joining trajectory so as to cause the said joining trajectory to pass through one or the other of the boundaries F1 or F2.

3. The method according to claim 1, further comprising a step of modifying the joining trajectory in such a way that the said joining trajectory passes through a point FAF3, the point FAF3 being the intersection of the boundaries F1 and F2.

4. The method according to claim 1, further comprising a step of determining the total energy to be dissipated along the joining trajectory.

5. The method according to claim 4, the determination being further based on a predefined descent profile.

6. The method according to claim 4, further comprising a step of comparing the total energy to be dissipated and the energy associated with the joining trajectory determined.

7. The method according to claim 6, further comprising a step of emitting an alert if the energy associated with the joining trajectory such as determined is greater than the total energy to be dissipated or in performing a display of conformity if the energy associated with the joining trajectory such as determined is less than the total energy to be dissipated.

8. The method according to claim 1, further comprising a step of modifying the joining trajectory if the energy associated with the joining trajectory such as determined is greater than the total energy to be dissipated.

9. The method according to claim 8, further comprising a step of increasing the length of the joining trajectory.

10. The method according to claim 8, further comprising a step of using the airbrakes of the aircraft.

11. The method according to claim 8, the step of increasing the length of the joining trajectory comprising a step of spatially displacing any one of the determined points FF, FAF2 or FAF3 by adding a straight section.

12. The method according to claim 4, the steps being repeated over time.

13. A computer program product stored on a non-transitory computer-readable storage medium, the computer program comprising code instructions to perform a method of calculating a lateral approach trajectory of an aircraft, when said computer program is executed on a computer, the method comprising the steps of:

receiving selection of a landing runway;

receiving indication of a trajectory point FF, said trajectory point FF defining a point of alignment of the aircraft with a view to landing on the selected landing runway;

determining a zone Z1 to be avoided, said zone Z1 defining trajectory limits to carry out a last turn with a view to landing on the runway indicated as a function of manoeuvrability capabilities of said aircraft and of conditions exterior to said aircraft;

determining a joining trajectory bound for a point FAF2 situated on the axis perpendicular to the final approach at the level of the point FF and far enough away as to guarantee a maximum roll for the alignment at the said point FF, the joining trajectory going from the aircraft to the point FAF2 and then to the point FF and then to the indicated landing runway without passing through the zone Z1.

14. A system configured to implement a method of calculating a lateral approach trajectory of an aircraft, the method comprising the steps of:

receiving selection of a landing runway;

receiving indication of a trajectory point FF, said trajectory point FF defining a point of alignment of the aircraft with a view to landing on the selected landing runway;

determining a zone Z1 to be avoided, said zone Z1 defining trajectory limits to carry out a last turn with a view to landing on the runway indicated as a function of manoeuvrability capabilities of said aircraft and of conditions exterior to said aircraft;

determining a joining trajectory bound for a point FAF2 situated on the axis perpendicular to the final approach at the level of the point FF and far enough away as to guarantee a maximum roll for the alignment at the said point FF, the joining trajectory going from the aircraft to the point FAF2 and then to the point FF and then to the indicated landing runway without passing through the zone Z1.

15. The system according to claim 14, comprising avionic means of flight management system type of FMS type and/or non-avionic means of electronic flight bag type of EFB type and/or means of augmented or virtual reality.

* * * * *